United States Patent Office

3,629,151
Patented Dec. 21, 1971

3,629,151
OXYHALOGENATION CATALYSTS
Clarence O. Miller, Sulphur, La., and Charles G. McAlister, Linthicum Heights, Md., assignors to Cities Service Company, New York, N.Y.
No Drawing. Filed Oct. 18, 1968, Ser. No. 768,902
Int. Cl. B01j 11/82
U.S. Cl. 252—443                                    12 Claims

ABSTRACT OF THE DISCLOSURE

Processes are described for preparing thermally stable oxyhalogenation catalyst compositions having a copper silicide or copper-silicon alloy superstrate and a silicon carbide substrate. The unique stability of these catalysts under high temperature oxyhalogenation conditions is illustrated by the prolonged use of such material to catalyze the reaction of ethylene, oxygen and hydrogen chloride to produce 1,2-dichloroethane.

BACKGROUND OF THE INVENTION

Field of the invention

This invention relates to novel oxyhalogenation catalysts comprising a copper silicide or copper-silicon alloy on a silicon carbide support. It also relates to processes for producing such catalyst compositions by the high temperature reaction of a copper oxide with silicon carbide.

Description of the prior art

The use of various metals, metal salts and metal oxides to catalyze the oxidation of hydrogen halides (the Deacon reaction) and to catalyze the oxyhalogenation of a number of saturated and unsaturated hydrocarbons is well known. Inorganic compounds of heavy metals, such as the chlorides of nickel, iron, the rare earth metals and especially copper, are widely used, either alone or in combination with compounds of activator metals, such as potassium, in the commercial production of chlorine and chlorinated hydrocarbons. They are generally employed in conjunction with a porous absorptive carrier, such as diatomaceous earth, silicate clay, silica gel, pumice or alumina. The metal compound is sometimes merely mixed with the support material and then pelletized, but supported catalyst compositions are more frequently prepared by impregnating the carrier with an aqueous solution of the metal salt and then drying the mixture. Similar compositions have also been prepared by vaporizing the heavy metal compound onto the support or by spraying an aqueous solution of the heavy metal compound on a fluidized and heated support.

While many of these prior art materials are initially effective catalysts, they are generally characterized by a short useful life under the high temperature conditions to which they are exposed in conventional Deacon or oxyhalogenation reactions. In the case of the supported copper bearing catalysts, the rapid decline in activity and selectivity that is usually observed in such use is attributed primarily to the thermally induced migration of volatile copper halides which are formed during the reaction. The effect of this mobility is a rapid loss of copper halides through vaporization and the formation of local concentrations of catalytically active sites, which make it extremely difficult to maintain the low temperature gradient within the catalyst mass that is necessary to avoid feedstock or product losses at "hotspots."

SUMMARY

It is an object of this invention to provide improved supported copper oxyhalogenation catalyst compositions which retain their high catalytic activity and selectivity after prolonged exposure to high reaction temperatures. More specifically, it is an object of this invention to provide oxyhalogenation catalyst compositions which are less susceptible than the similar prior art materials to the loss of activity through vaporization of copper halides and to the loss of selectivity due to "hot spotting." Another object is to provide a simple process for producing such thermally stable compositions. It has now been found that these and other objects, which will be obvious to those skilled in the art, can be achieved by operation in accordance with the instant invention.

Broadly, this invention involves supported catalyst compositions comprising a substrate of silicon carbide and a superstrate selected from the group consisting of copper silicides, alloys of silicon and copper, and combinations thereof. This invention also involves a preferred method of producing such compositions in which the components are adherently bound together comprising reacting silicon carbide with copper oxide at a temperature above about 600° C.

These novel supported copper catalyst compositions are useful in any application in which the aforementioned similar prior art catalyst compositions have been employed. They are unusually active and selective when used in a Deacon reaction or in the oxyhalogenation of a wide variety of aromatic and both saturated and unsaturated aliphatic hydrocarbons. The useful life of these materials is many times longer than that of previously available catalysts, as demonstrated by Examples 6 through 9 below. Whereas replacement of prior art catalysts is usually necessary after a few hours of high temperature operation, catalysts of this invention exhibit no diminution of activity or selectivity at the end of as much as ten days use. This greatly superior thermal stability is, of course, of great advantage in any commercial Deacon or oxyhalogenation operation.

DESCRIPTION OF THE PREFERRED EMBODIMENTS

The copper content of the catalyst compositions of this invention can be as high as 50 weight percent or more; however, for most applications, a preferred level of from about 0.1 weight percent to about 15 weight percent is suitable. The silicon carbide component advantageously comprises at least 25 weight percent, preferably more than 50 weight percent, of the composition. Other porous support materials and catalytically active or activator metal compounds which have been used in similar prior art catalysts may also be present, preferably in quantities less than about 25 weight percent of the composition. Especially favorable results can be obtained by the use of compositions which contain from about 0.5 to about 4 weight percent copper, from 0 to about 4 weight percent of other active metals, such as cerium, lanthanum, manganese, chromium, iron or potassium, and at least about 85 weight percent silicon carbide.

While one may employ a catalyst composition in which all of the copper is present as a copper silicide or alloy of copper and silicon, it is not essential to exclude other copper compounds or even metallic copper, as the aforementioned advantages of these catalysts can often be fully realized when as little as 0.1% of the total copper is present as a copper silicide or an alloy of copper and silicon, and many of these advantages can be observed when only traces of these materials are detectable. The reason for the effectiveness of minute quantities of copper silicide or copper-silicon alloy in combination with a silicon carbide support in preventing the loss or migration of volatile copper halides is not known. Regardless of the presence of such other forms of copper in the original catalyst, after a period of normal use, the copper appears as an equilibrium mixture of containing no more than the original quantity of copper silicide or copper-silicon alloy, along with metallic copper, copper halides and often copper oxides, the proportions of each being dependent as much on the nature and conditions of the reaction as on the original form of the copper. Since the formation of an equilibrium mixture usually reduces the proportion of copper present as a silicide or silicon alloy, it is desirable that a catalyst composition, that is made for a specific reaction and reaction conditions, originally contain such material in a quantity in excess of that which would be found in the optimum equilibrium mixture for such reaction and conditions. One can generally be assured of such excess when as little as about 1% to 5% of the total copper in the unused catalyst composition is in the form of a silicide or silicon alloy.

Any copper silicide, such as $Cu_4Si$, or any copper-silicon alloy is highly effective for this purpose. Although these materials are often extremely difficult to distinguish analytically, particularly in low concentrations in equilibrium mixtures of copper compounds as found in used catalyst compositions, it has been observed that compositions in which copper silicides were originally clearly identifiable are generally superior to those originally containing only alloy.

The catalyst compositions of this invention may be produced by many of the methods employed in the manufacture of similar prior art supported oxyhalogenation catalysts; e.g. by dry blending the copper silicide or copper-silicon alloy with silicon carbide and pelletizing the mixture, with or without a binder. Improved products can, however, be obtained when the copper component is adherently bound to the substrate. Among the methods that can be used to accomplish this result is calcining to effect fusion of the components, such as by heating a $Cu_4Si$/SiC blend to a temperature above about 850° C. Another approach, which is preferred for convenience and product superiority, is to deposit a copper oxide on the silicon carbide support and heat the mixture to a temperature above about 600° C. The resulting reaction, which liberates oxides of carbon, produces an outstanding catalyst composition.

While this reaction proceeds at a reasonable rate at any temperature above about 750° C., it is preferred to employ a temperature of from about 850° C. to about 1,150° C. in order to obtain a product containing readily identifiable copper silicides. Suitable bonded catalyst compositions may be obtained by maintaining such temperatures for a few minutes; however, it is generally preferred that the mixture be held at reaction temperature for from about 1 to about 8 hours or more to convert all or at least a major portion of the copper oxides. Temperatures as high as 1,500° C. or above can, if desired, be employed to reduce this reaction time. At high temperatures or during long reaction periods, the reaction mixture is advantageously blanketed with an inert gas such as argon or carbon dioxide, in order to prevent excessive air oxidation of the silicon carbide support.

The superiority of catalyst produced by this preferred method is believed to be due to the fact that the copper silicide or copper-silicon alloy produced by the reaction of copper oxide with silicon carbide is trapped within the crystal lattice of the unreacted portion of the silicon carbide support. Since such lattice intermeshing occurs only at the surface of the support, it is highly desirable to employ as intimate a mixture of copper oxide and silicon carbide support as possible; i.e. one in which the copper oxide is deposited on the pore surfaces as well as the outer surfaces of the support.

A particularly effective method of obtaining such intimate mixture is by wetting particles of silicon carbide with an aqueous solution of a copper salt that is readily converted to an oxide, such as cuprous chloride, cupric chloride, cuprous bromide, cupric iodide, cupric nitrate or cupric sulfate; drying the impregnated support; and, either during or after drying, oxidizing the salt. The oxidation step can usually be carried out simply by contacting the impregnated support at any suitable temperature up to about 600° C. with an oxygen source, such as a peroxide or preferably air.

Neither the temperature nor pressure employed during the step of wetting the support material with the aqueous solution of copper salt is critical, so long as the water is maintained in a liquid condition. Atmospheric pressure and room temperature operation is usually entirely satisfactory. Similarly, any temperature or pressure may be used during the subsequent drying step which will facilitate removal of the water. It is generally preferable to conduct this drying operation at a temperature of 100° C. or slightly lower in order to avoid the exuding of copper salt solution from the pores of the support which may accompany rapid boiling of the aqueous solvent. It may also be advantageous to conduct this drying operation under a vacuum and to subject the wetted support to periodic sudden increases in pressure, as by breaking the vacuum, in order to force the copper salt back into these pores. Inasmuch as conversion of the copper salt to oxide by air is generally expedited by the use of temperatures far in excess of 100° C., it is usually preferred to complete the drying operation before beginning the oxidation step.

The time required to complete the conversion of the copper salt to oxide may vary widely depending on the particular salt employed, the volume of available oxygen and the oxidation temperature. For example, a preferred copper salt, cupric nitrate, can be quantitatively converted to oxide in a forced air draft oven in a few hours at 150° C., or in less than an hour at 400° C.

The superiority of the catalyst compositions of the instant invention will be apparent from an examination of the following examples. Examples 1 through 5 illustrate preferred methods for their preparation, while their effectiveness as oxychlorination catalysts is clearly demonstrated by a comparison of Examples 6 and 9, which employ the novel catalyst compositions of this invention, with Examples 7 and 8 which employ similar prior art catalysts.

While this invention has been described in considerable detail in respect of certain preferred embodiments thereof, it will be obvious to those skilled in the art that numerous variations and modifications can be made without departing from the spirit and scope of the appended claims.

EXAMPLE 1

A clean two liter glass flask is half filled with 1,009 grams of 3/16" silicon carbide spheres. A solution of cupric nitrate trihydrate in distilled water, which contains 0.2 gram of copper per milliliter, is then added to the flask to cover the silicon carbide spheres. After 20 minutes of soaking, the excess liquid is drained off and the wetted silicon carbide spheres, which have taken up 153 milliliters of the salt solution, are heated to 90° to 95° C. for two hours under reduced pressure provided by a water aspirator. The vacuum is periodically released during this heating to force exuded salt solution back into the pores of the silicon carbide spheres. After 2 hours, the surfaces of these spheres are dry to the touch and they are transferred to a forced draft oven, where they are heated in an airstream at 160° C. for eight hours. The spheres are then placed in an electric furnace, blanketed with argon, heated to 850° C. and held at this temperature for two hours. During this period substantial quantities of oxides of carbon are evolved. After cooling in the furnace overnight, the catalyst composition is found to contain 3 weight percent copper. Spectrographic and X-ray analyses show the presence of copper silicide.

EXAMPLE 2

A clean dry 1 liter glass flask is charged with 60 milliliters of distilled water, 47.8 grams of cerium nitrate and 32.5 grams of cuprous nitrate trihydrate. After stirring for a few minutes with gentle heating to dissolve the salts, 400 grams of 3/16″ silicon carbide spheres are added to the flask. The flask is then periodically shaken while being heated on a steam bath under a reduced pressure of about 25 millimeters of mercury for 30 minutes. The superficially dried contents of the flask is then transferred to an evaporating dish which is placed in an air swept muffle furnace and heated for 8 hours at 260° C. The air sweep is then discontinued and the furnace temperature raised to 1,100° C. over a 7 hour period. The catalyst composition is immediately removed from the furnace and cooled under dry air.

EXAMPLE 3

The procedure of the preceding example is repeated except that 16 grams of cupric chloride are employed instead of cupric nitrate trihydrate.

EXAMPLE 4

A homogeneous mixture of 16 grams of finely divided cuprous oxide and 160 grams of finely divided high purity silicon carbide is placed in a muffle furnace, blanketed with carbon dioxide and heated to 1,100° C. over an 8 hour period. After cooling, the fused mixture is crushed and then pressed into pellets that will pass through an 8 mesh (Tyler Standard) screen.

EXAMPLE 5

The procedure of the preceding example is repeated employing 18 grams of cupric oxide in place of cuprous oxide.

EXAMPLE 6

An electrically heated Monel metal upright tubular reactor having an internal diameter of 1.1″ is charged with 710 milliliters of the catalyst of Example 1. The space in the reactor above the catalyst bed is filled to a depth of 20″ with 6 millimeter ceramic saddles which function as a feed preheat zone. The reactor temperature is raised to 345° C. and feeds are introduced into the top at the following rates: ethylene, 1.25 moles per hour; hydrogen chloride, 2.50 moles per hour; and air, 86 liters per hour. Effluent from the bottom of the reactor is passed through an icewater condenser where liquids are collected. Samples of these liquids, which are taken periodically, are worked up by diluting with petroleum ether and then extracting twice with aqueous sodium bicarbonate. The separated ether phase is then steam distilled to remove the ether and the remaining liquid products are analyzed for 1,2-dichloroethane. The results are shown in Table I.

TABLE I

| Hours of catalyst use: | Grams hours [1] |
|---|---|
| 1/2 | 107 |
| 9 1/2 | 109 |
| 14 1/2 | 108 |
| 19 1/2 | 108 |
| 25 | 109 |
| 31 | 107 |
| 41 | 109 |
| 189 | 110 |
| 198 | 114 |
| 229 1/2 | 111 |
| 235 | 111 |
| 240 | 112 |

[1] Rate of production of 1,2-dichloroethane.

EXAMPLE 7

The procedure of the preceding example is repeated employing a catalyst that is prepared by the method of claim 1, except that the electric furnace is maintained at a maximum temperature of 500° C. and no oxides of carbon are evolved during this operation. Catalyst efficiency, as measured by the rate of 1,2-dichloroethane production, declines rapidly after a few hours of use.

EXAMPLE 8

The procedure of Example 6 is repeated employing a conventional 3 weight percent oxychlorination catalyst which is prepared by impregnating 3/16″ silicon carbide spheres with aqueous cuprous chloride and drying the impregnated spheres at 150° C. for 8 hours. The life of this catalyst is substantially inferior to that employed in Example 6.

EXAMPLE 9

The procedure of Example 6 is repeated in separate runs employing the catalysts of Examples 2 through 5. Analyses of the periodically sampled product show that, in each run, catalyst activity and selectivity remains high after prolonged operation.

We claim:

1. Catalyst composition comprising an intimate mixture of silicon carbide and a member selected from the group consisting of copper silicides, alloys of silicon and copper and combinations thereof, said composition containing from about 0.1 to about 50 weight percent copper and at least about 25 weight percent silicon carbide.

2. The composition of claim 1 containing from about 0.1 weight percent to about 15 weight percent copper and at least about 50 weight percent silicon carbide.

3. The composition of claim 1 wherein said mixture contains a copper silicide.

4. The composition of claim 3 wherein said copper silicide is adherently bound to the surface of a silicon carbide support.

5. The composition of claim 1 wherein said mixture contains an alloy of silicon and copper.

6. Process for preparing a catalyst having a silicon carbide support comprising reacting copper oxide with a stoichiometric excess of silicon carbide at a temperature of from about 600° C. to about 1500° C.

7. The process of claim 6 wherein said reaction is conducted in an inert atmosphere.

8. Process of claim 7 wherein said reaction temperature is maintained until the evolution of oxides of carbon substantially ceases.

9. The process of claim 6 wherein said reaction temperature is from about 750° C. to about 1,150° C.

10. The process of claim 9 wherein said silicon carbide is impregnated with said cupric oxide prior to initiating said reaction.

11. The process of claim 10 wherein said impregnation is effected by wetting silicon carbide with an aqueous solution of a water soluble copper salt and contacting the wetted mass with oxygen to convert said water soluble salt to an oxide.

12. The process of claim 11 wherein said water soluble copper salt is cupric nitrate.

References Cited

UNITED STATES PATENTS

| 2,520,712 | 8/1950 | Cheney | 260—677 |
| 833,427 | 10/1906 | Tone | 23—204 |
| 3,042,728 | 7/1962 | Hirsh | 260—662 |
| 3,180,840 | 4/1965 | Shotts | 252—443 |

DANIEL E. WYMAN, Primary Examiner

P. M. FRENCH, Assistant Examiner

U.S. Cl. X.R.

260—659; 23—204